(12) United States Patent
Greenberg et al.

(10) Patent No.: US 6,496,877 B1
(45) Date of Patent: Dec. 17, 2002

(54) METHOD AND APPARATUS FOR SCHEDULING DATA ACCESSES FOR RANDOM ACCESS STORAGE DEVICES WITH SHORTEST ACCESS CHAIN SCHEDULING ALGORITHM

(75) Inventors: Richard Greenberg; David Robison Hall, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,456

(22) Filed: Jan. 28, 2000

(51) Int. Cl.[7] ................................................. G06F 13/14
(52) U.S. Cl. ........................................... 710/6; 711/112
(58) Field of Search .......................... 711/111, 112, 167; 710/5, 6, 24, 39; 707/2

(56) References Cited

U.S. PATENT DOCUMENTS

| | | | | |
|---|---|---|---|---|
| 5,367,669 A | * | 11/1994 | Holland et al. ................. | 714/7 |
| 5,570,332 A | * | 10/1996 | Heath et al. .................... | 369/32 |
| 6,029,163 A | * | 2/2000 | Ziauddin ........................ | 707/2 |
| 6,145,052 A | * | 11/2000 | Howe et al. .................. | 711/112 |
| 6,154,739 A | * | 11/2000 | Wrobel ............................ | 707/6 |
| 6,170,042 B1 | * | 1/2001 | Gaertner et al. ............. | 711/158 |
| 6,272,473 B1 | * | 8/2001 | Sandholm ..................... | 705/37 |
| 6,272,565 B1 | * | 8/2001 | Lamberts ...................... | 710/43 |

OTHER PUBLICATIONS

Teorey, Toby J., et al., "A Comparative Analysis of Disk Scheduling Policies", Communications of the ACM, 1972, pp. 177–184.*

Andrews, Matthew, et al., "New Algorithms for the Disk Scheduling Problem", IEEE, 1996, pp. 550–559.*

* cited by examiner

*Primary Examiner*—Gary J Portka
(74) *Attorney, Agent, or Firm*—Joan Pennington

(57) ABSTRACT

A method and apparatus are provided for scheduling commands for random access storage devices with a shortest access chain scheduling algorithm. A plurality of possible chains for a queue of commands are processed. The plurality of possible chains are compared to identify one of the plurality of possible chains having a predetermined property. A first command of the identified one chain having the predetermined property is selected as a next command to execute. The predetermined property includes, for example, a shortest access time or a lowest energy usage.

20 Claims, 14 Drawing Sheets

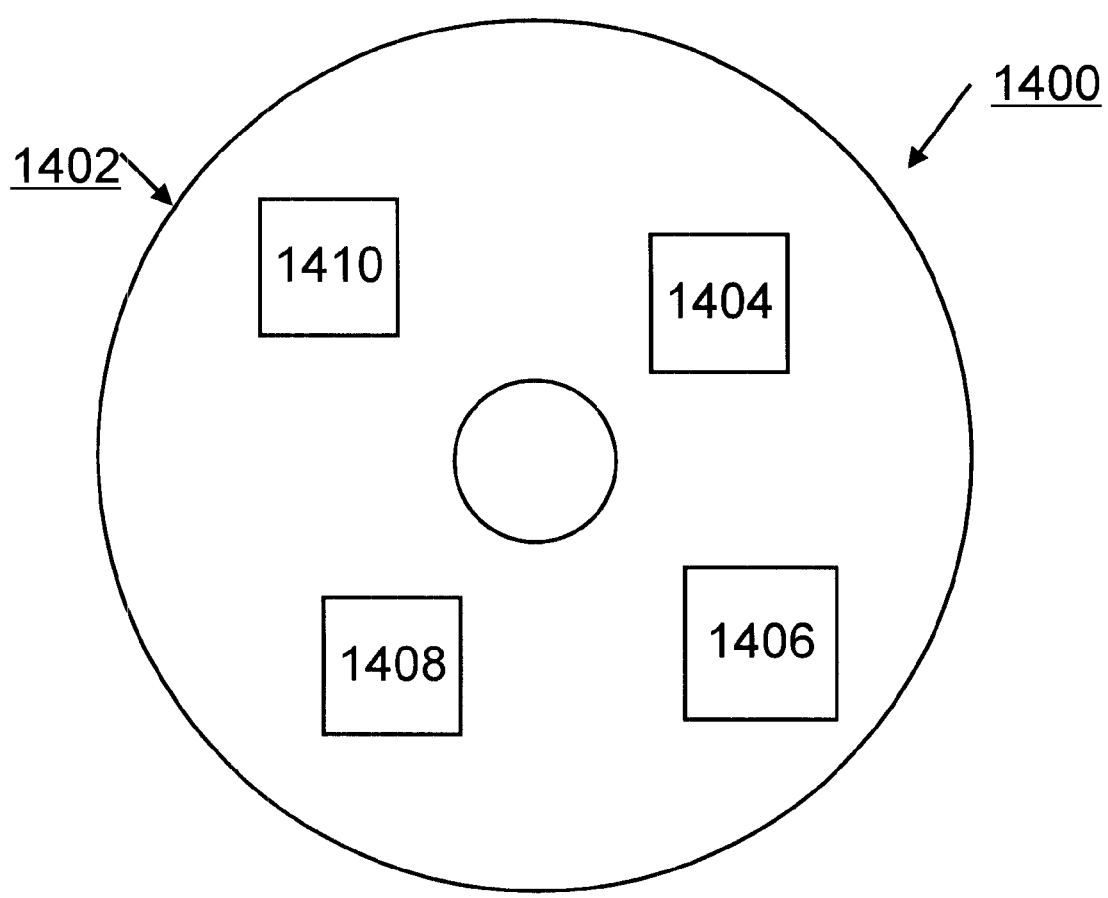

METHOD AND APPARATUS FOR SCHEDULING DATA ACCESSES FOR RANDOM ACCESS STORAGE DEVICES WITH SHORTEST ACCESS CHAIN SCHEDULING ALGORITHM

FIELD OF THE INVENTION

The present invention relates generally to the data processing field, and more particularly, relates to a method and apparatus for scheduling data accesses for random access storage devices with a shortest access chain scheduling algorithm.

DESCRIPTION OF THE RELATED ART

In random access storage devices, such as hard disk and CD-ROM drives, the data to be accessed next is chosen from a list of outstanding commands. The list of outstanding commands is referred to as a queue. The act of choosing the next command is known as scheduling. In general, the goal of the scheduling algorithm is to minimize the average access time for its commands. Many scheduling methods have been used including Shortest-Seek First (SSF), Shortest-Latency First (SLF), and Shortest-Access Time First (SATF). These algorithms share one thing in common, they only look at what the next command will be when choosing the best candidate. This is similar to a chess player only looking at the next move to make without considering his opponent's next move. In the case of a chess player, only looking one move ahead results in poor play. In the case of scheduling commands, this results in poor performance.

A need exists for an improved scheduling algorithm for random access storage devices.

SUMMARY OF THE INVENTION

A principal object of the present invention is to provide a method and apparatus for scheduling commands for random access storage devices with a shortest access chain scheduling algorithm. Other important objects of the present invention are to provide such a method and apparatus for scheduling commands for random access storage devices with a shortest access chain scheduling algorithm substantially without negative effect; and that overcome many of the disadvantages of prior art arrangements.

In brief, a method and apparatus are provided for scheduling commands for random access storage devices with a shortest access chain scheduling algorithm. A plurality of possible chains for a queue of commands are processed. The plurality of possible chains are compared to identify one of the plurality of possible chains having a predetermined property. A first command of the identified one chain is selected as a next command to execute.

In accordance with features of the invention, the predetermined property includes, for example, a shortest access time or a lowest energy usage.

BRIEF DESCRIPTION OF THE DRAWINGS

The present invention together with the above and other objects and advantages may best be understood from the following detailed description of the preferred embodiments of the invention illustrated in the drawings, wherein:

FIG. 14 is a block diagram illustrating a computer program product in accordance with the preferred embodiment.

DETAILED DESCRIPTION OF THE PREFERRED EMBODIMENTS

Figure 1:
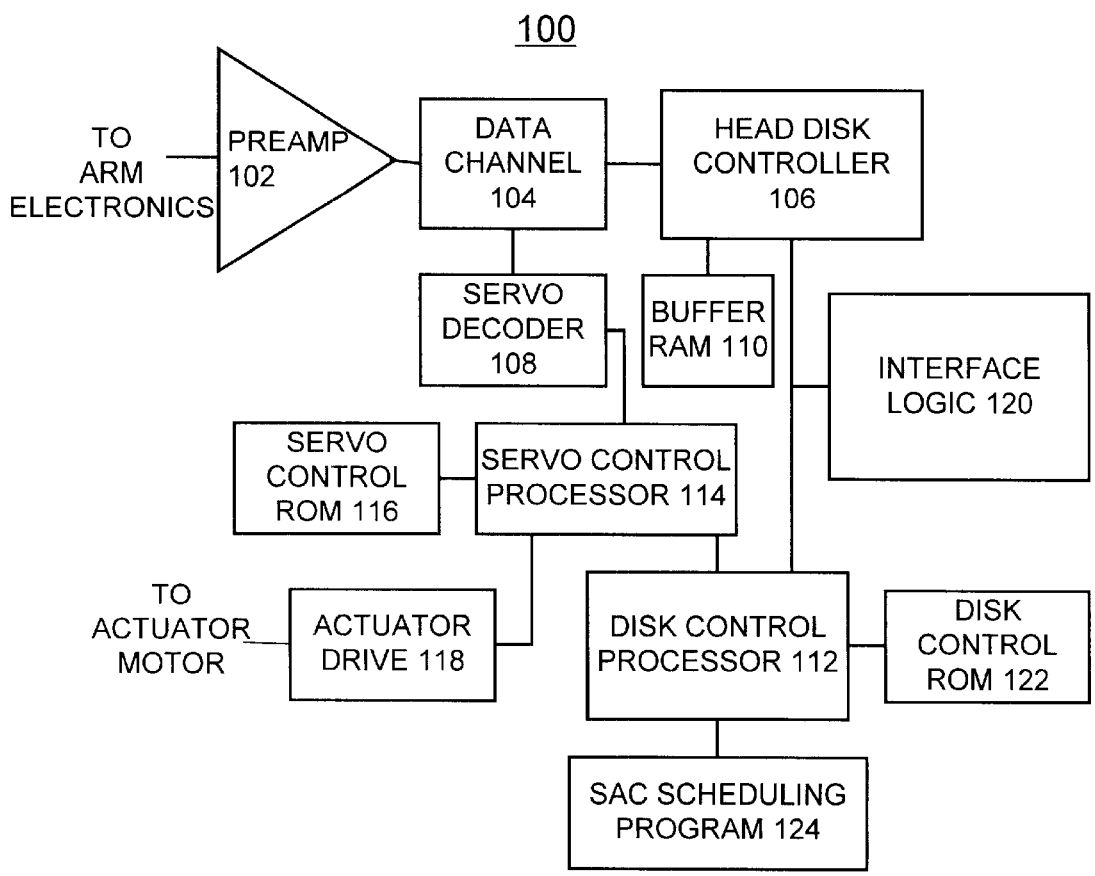
FIG. 1 is a block diagram representation illustrating a disk file system for implementing methods for scheduling data accesses for random access storage devices with a shortest access chain scheduling algorithm in accordance with the preferred embodiment.

Having reference now to the drawings, in FIG. 1, there is shown a disk file system for carrying out the scheduling method of the preferred embodiment generally designated by the reference character 100. Servo information and customer data are amplified by a preamplifier (preamp) 102. A data channel 104 uses sampling techniques for detecting the readback signals from the disk surfaces that contain the customer data. A head disk controller 106 is coupled to the data channel 104. A servo decoder 108 coupled to the data channel 104 provides a servo timing signal to the head disk controller 106. A buffer random access memory 110 is coupled to the head disk controller 106. A disk control processor 112 is coupled to the head disk controller 106 and to a servo control processor 114. A servo control read only memory (ROM) 116 and an actuator drive 118 are coupled to the servo control processor 114. The servo control processor 114 performs servo control functions providing servo positioning control signals to the actuator driver 118 that is coupled to an actuator motor assembly (not shown). An interface logic 120 coupled to the head disk controller 106 and the disk control processor 112 performs interface logic functions. A disk control read only memory (ROM) 122 is coupled to the disk control processor 112. Scheduling data accesses is provided with a shortest access chain (SAC) scheduling program 124 of the preferred embodiment coupled to the disk control processor 112. Disk control processor unit 112 is suitably programmed to execute the flow charts of FIGS. 2, 3, 4, 5, 6, 7, and 8 of the preferred embodiment.

In accordance with features of the invention, an average time for processing a set of random commands is reduced, thereby increasing throughput to or from the random access storage device. The method of the preferred embodiment anticipates a chain of commands and their access times. A chain includes more than one command. These chains of commands are then compared, with the first command of the best chain, the chain having a predetermined property, is chosen as the next command to execute. In accordance with features of the invention, the comparison is done efficiently. It should be understood that the term predetermined property as used in the specification and claims can include various properties of the chains of commands being compared, for example, shortest access time and energy usage.

Figure 2:
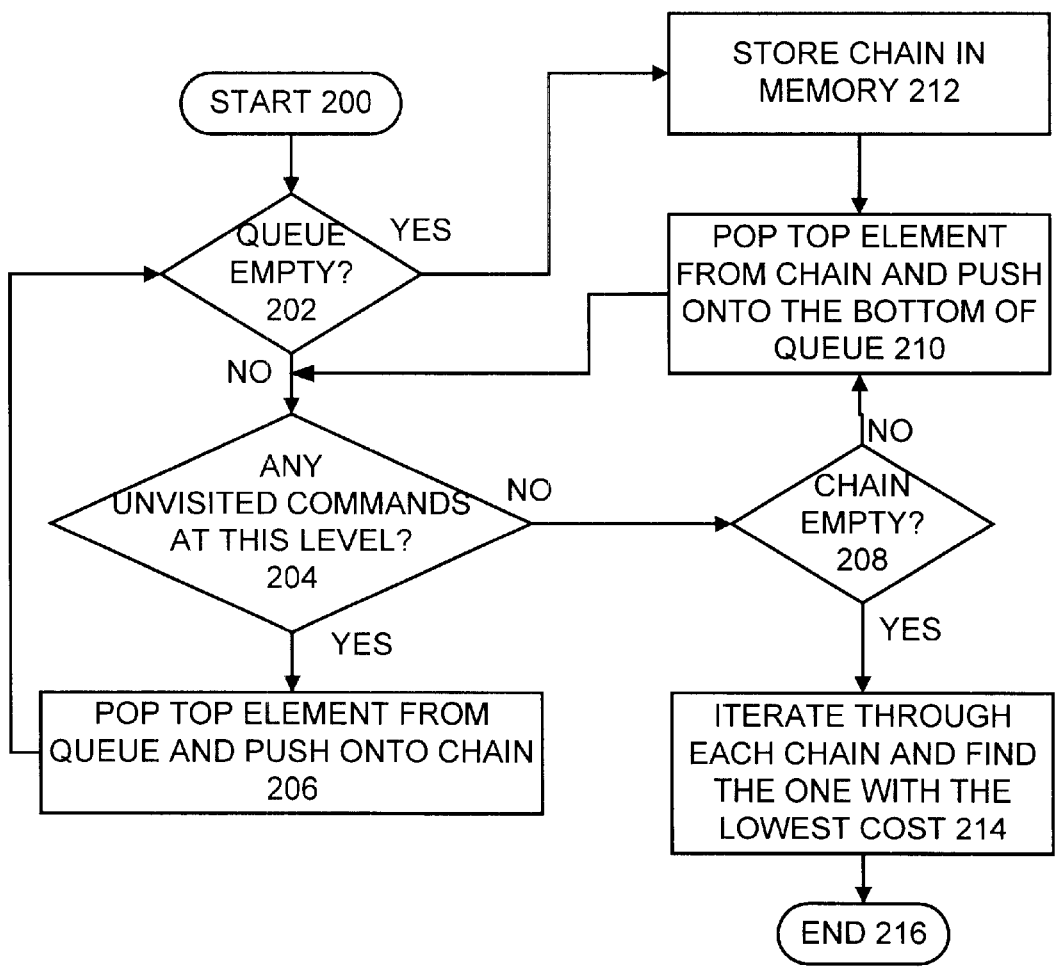
FIGS. 2, 3, 4, 5, 6, 7, and 8 are flow charts illustrating exemplary sequential steps for scheduling data accesses for random access storage devices with a shortest access chain scheduling algorithm in accordance with the preferred embodiment.

Referring to FIG. 2, there is shown a flow chart illustrating sequential steps for scheduling commands in accordance with a brute force search of the preferred embodiment starting at a block 200. The initial state includes a current_cmd or command whose seek is in progress, a chain or stack containing the current_cmd and a queue or stack of all unserviced drive commands. Each command in the command queue is examined to determine the amount of time to access the first block of data. This is done by determining the rotational latency between the current location and the command examined. It is next determined how long the seek will take from the current location and the command examined. From these two pieces of information, the access time is calculated, which is equal to the rotational latency, plus zero or more entire revolutions of time. For each of these commands, the command examined is then assumed to be the current location and the process is repeated for the remaining commands in the queue. At each step, the access time of the command chosen is added to a running total. This is repeated until the queue in each branch is empty. At this point, the total access time for each chain is known. All the access times are compared to each other and the best chain is chosen. The first command in the chain is then executed, followed by the second, third, and so on. The process is repeated every time a new command is introduced.

As indicated in a decision block 202, checking for an empty queue is performed. The command queue contains cylinder, head and sector information for each command candidate and is stored in a CAM within the disk control processor 112. When the command queue is not empty, checking for any unvisited commands at this level is performed as indicated in a decision block 204. When an unvisited commands at this level is identified, then the top element is popped from the queue and pushed onto chain as indicated in a block 206. Then the sequential operations return to decision block 202. When no unvisited commands at this level is identified at decision block 204, then checking for an empty chain is performed as indicated in a decision block 208. When the chain is not empty, then the top element is popped from the chain and pushed onto the bottom of the queue as indicated in a block 210. Then the sequential operations return to decision block 204 checking for any unvisited commands at this level. When the command queue is empty, the chain is stored in memory as indicated in a block 212. Then the top element is popped from the chain and pushed onto the bottom of the queue as indicated in a block 210. Then the sequential operations return to decision block 204 checking for any unvisited commands at this level. When the chain is empty at decision block 208, then each chain is iterated to find the chain with the lowest cost as indicated in a block 214.

Figure 3:
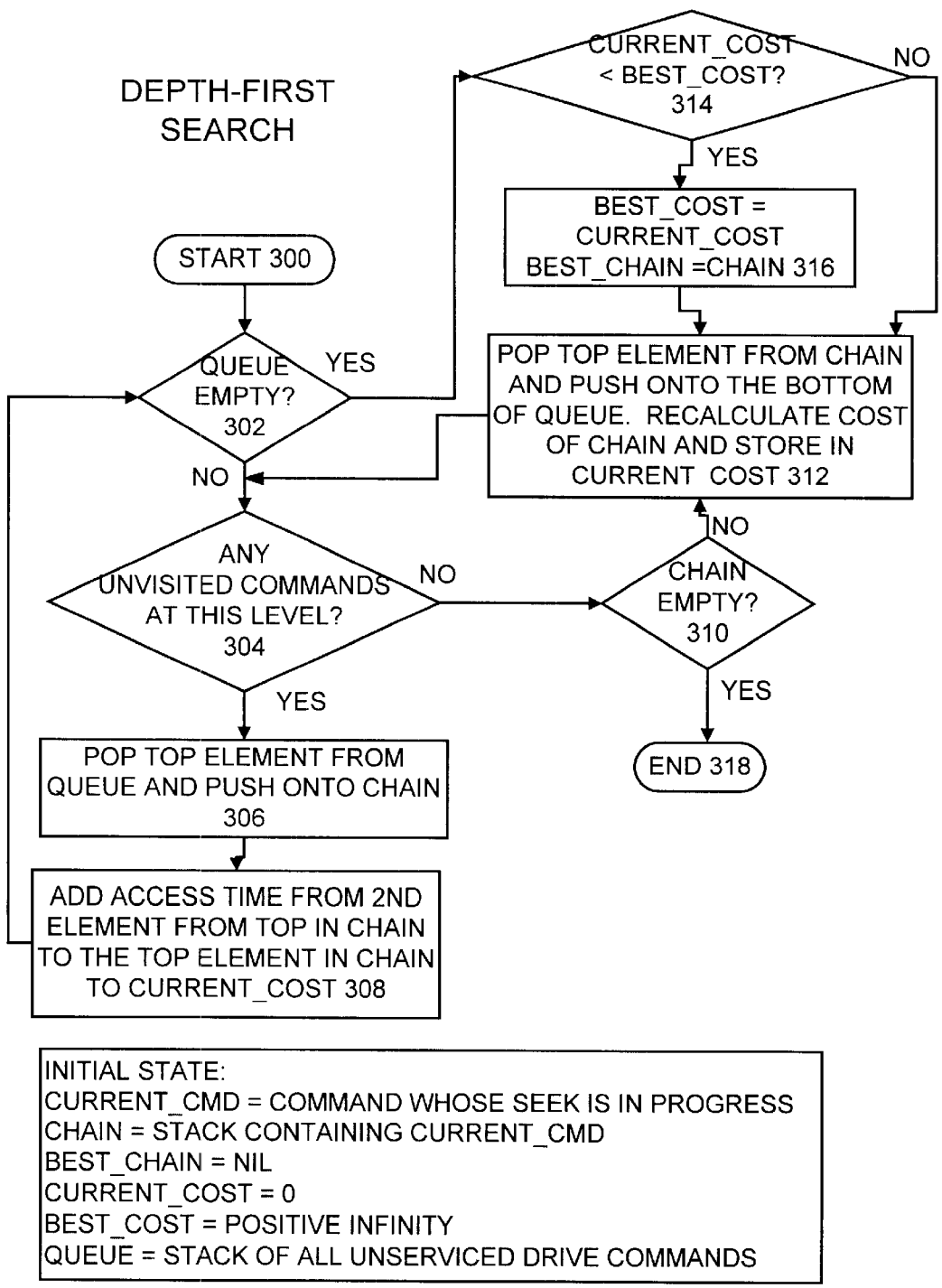

Referring to FIG. 3, there is shown a flow chart illustrating sequential steps for scheduling commands in accordance with a depth-first search of the preferred embodiment starting at a block 300. The initial state includes a current_cmd or command whose seek is in progress, a chain or stack containing the current_cmd, a best_chain equal to nil, a current_cost equal to zero, a best_cost equal to positive infinity and a queue or stack of all unserviced drive commands. In the depth-first search of the preferred embodiment, instead of expanding all of the different access branches and storing them in memory until the comparison is complete, only the best branch found so far needs to be stored. By only expanding down one branch at a time, significant memory reductions are possible. Where the memory requirements for the brute-force method of FIG. 2 grows exponentially with the queue depth, the depth-first method grows linearly.

Checking for an empty queue is performed as indicated in a decision block 302. When the command queue is not empty, checking for any unvisited commands at this level is performed as indicated in a decision block 304. When an unvisited command at this level is identified, then the top element is popped from the queue and pushed onto chain as indicated in a block 306. Then the access time from second element from the top of the chain the top element in the chain is added to current_cost as indicated in a block 308. Then the sequential operations return to decision block 302. When no unvisited commands at this level is identified at decision block 304, then checking for an empty chain is performed as indicated in a decision block 310. When the chain is not empty, then the top element is popped from the chain and pushed onto the bottom of the queue and the cost of the chain is recalculated and stored in current_cost as indicated in a block 312. Then the sequential operations return to decision block 304 checking for any unvisited commands at this level. When the command queue is empty, then the current_cost is compared to the best_cost as indicated in a decision block 314. When the current_cost is less than the best_cost, then the best_cost is set to the current_cost and the best_chain is set to this chain as indicated in a block 316. Then the top element is popped from the chain and pushed onto the bottom of the queue and the cost of the chain is recalculated and stored in current_cost at block 312. Then the sequential operations return to decision block 304 checking for any unvisited commands at this level. When the chain is empty at decision block 310, then the sequential operations end as indicated in a block 318.

Figure 4:
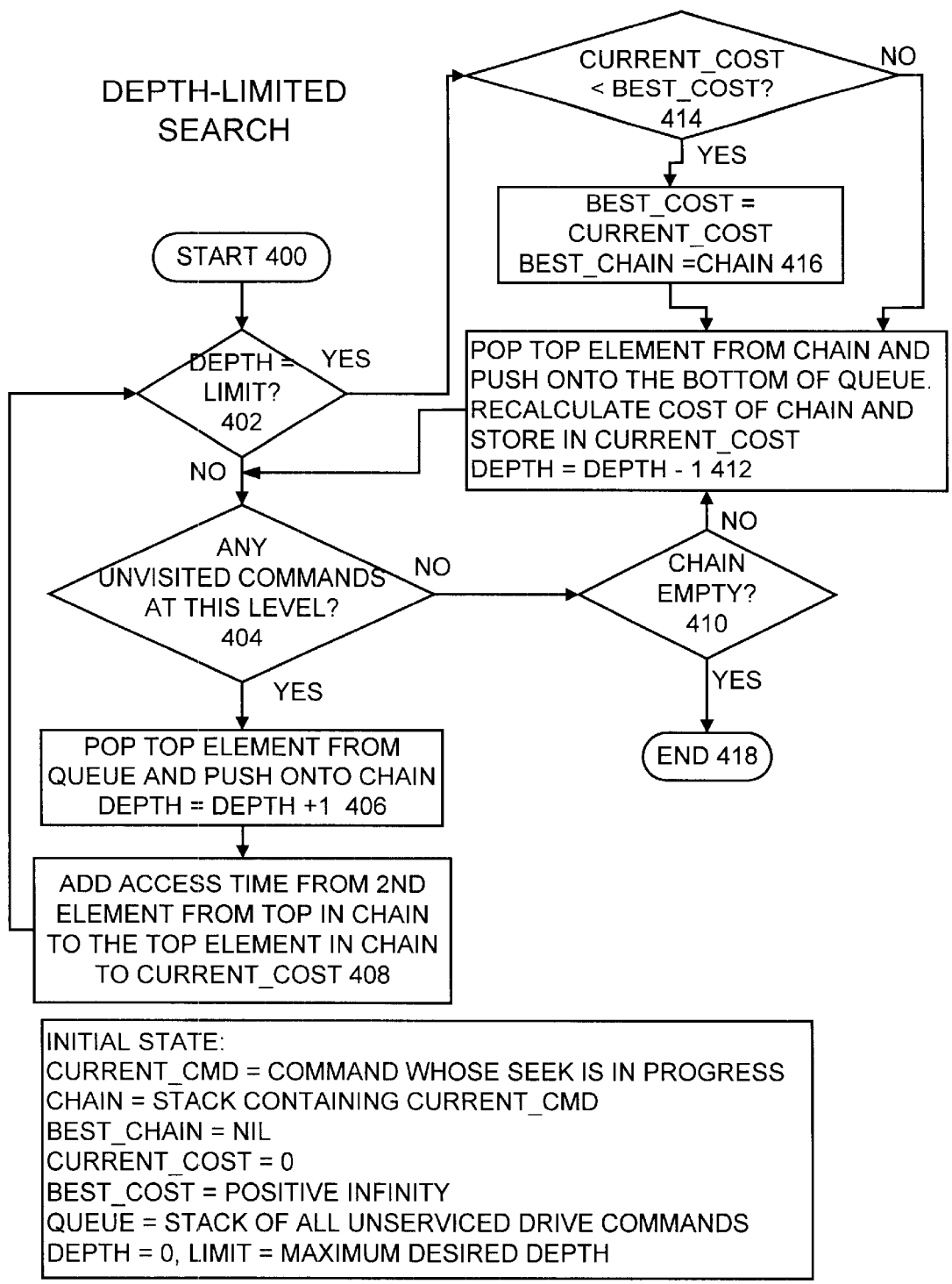

Referring to FIG. 4, there is shown a flow chart illustrating sequential steps for scheduling commands in accordance with a depth-limited search of the preferred embodiment starting at a block 400. The initial state includes a current_cmd or command whose seek is in progress, a chain or stack containing the current_cmd, a best_chain equal to nil, a current_cost equal to zero, a best_cost equal to positive infinity, a queue or stack of all unserviced drive commands, a depth equal to zero and a limit equal to a maximum desired depth. It is not a requirement of the present invention that each branch must continue until the queue is empty. In order to save time, a maximum depth is set. Since the time complexity of a depth-first search grows exponentially with depth, this parameter advantageously can be set.

Checking for a depth equal to the limit is performed as indicated in a decision block 402. When the depth is not equal to the limit, checking for any unvisited commands at this level is performed as indicated in a decision block 404. When an unvisited command at this level is identified, then the top element is popped from the queue and pushed onto chain as indicated in a block 406. Then the access time from second element from the top of the chain the top element in the chain is added to current_cost as indicated in a block 408. Then the sequential operations return to decision block 402. When no unvisited commands at this level is identified at decision block 404, then checking for an empty chain is performed as indicated in a decision block 410. When the chain is not empty, then the top element is popped from the chain and pushed onto the bottom of the queue, the cost of the chain is recalculated and stored in current_cost and the depth is decremented by one as indicated in a block 412. Then the sequential operations return to decision block 404 checking for any unvisited commands at this level. When depth is equal to the limit, then the current_cost is compared to the best_cost as indicated in a decision block 414. When the current_cost is less than the best_cost, then the best_cost is set to the current cost and the best chain is set to this chain as indicated in a block 416. Then the top element is popped from the chain and pushed onto the bottom of the queue, the cost of the chain is recalculated and stored in current_cost and the depth is decremented by one at block 412. Then the sequential operations return to decision block 404, checking for any unvisited commands at this level. When the chain is empty, at decision block 410, then the sequential operations end as indicated in a block 418.

Figure 5:
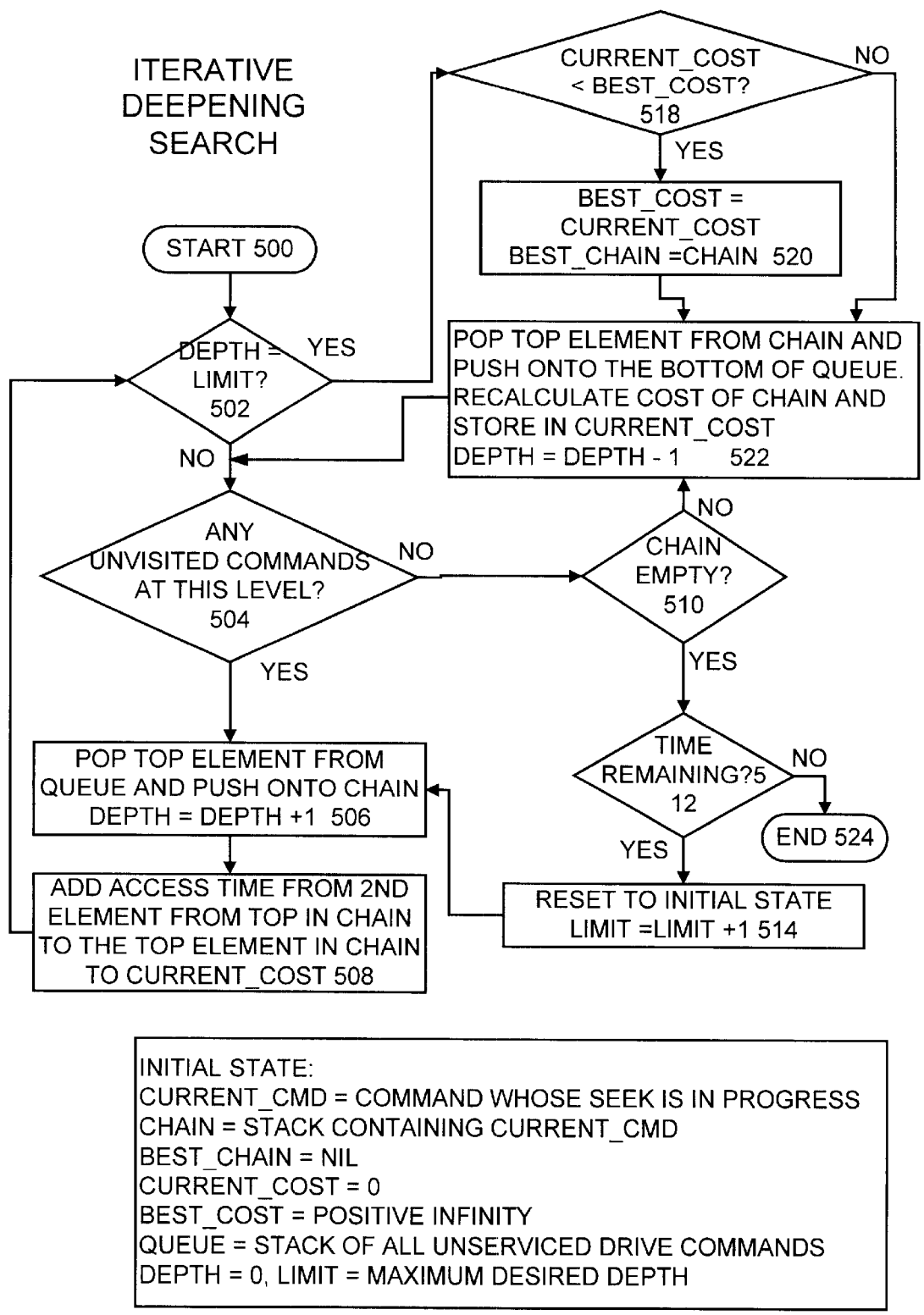

Referring to FIG. 5, there is shown a flow chart illustrating sequential steps for scheduling commands in accordance with an iterative deepening search of the preferred embodiment starting at a block 500. The initial state includes a current_cmd or command whose seek is in progress, a chain or stack containing the current_cmd, a best_chain equal to nil, a current_cost equal to zero, a best_cost equal to positive infinity, a queue or stack of all unserviced drive commands, a depth equal to zero and a limit equal to a maximum desired depth. The total time to perform a search of a given depth is not known ahead of time. To minimize this effect, multiple depth-limited searches can be performed at ever increasing depths. If the time allotted to calculating the next command expires, the best result from the last search completed can be used. The extra calculations done are small considering that the execution time grows exponentially with depth.

Checking for a depth equal to the limit is performed as indicated in a decision block 502. When the depth is not equal to the limit, checking for any unvisited commands at this level is performed as indicated in a decision block 504. When an unvisited command at this level is identified, then the top element is popped from the queue and pushed onto chain as indicated in a block 506. Then the access time from second element from the top of the chain the top element in the chain is added to current_cost as indicated in a block 508. Then the sequential operations return to decision block 502. When no unvisited commands at this level is identified at decision block 504, then checking for an empty chain is performed as indicated in a decision block 510. When the chain is empty, at decision block 510, then checking for time remaining is performed as indicated in a decision block 512. When there is time remaining, the conditions are reset to the initial state and the limit is incremented by one as indicated in a block 514. Then the sequential operations return to block 506 and the top element is popped from the queue and pushed onto chain. When depth is equal to the limit, then the current_cost is compared to the best_cost as indicated in a decision block 518. When the current_cost is less than the best_cost, then the best_cost is set to the current_cost and the best_chain is set to this chain as indicated in a block 520. Then the top element is popped from the chain and pushed onto the bottom of the queue, the cost of the chain is recalculated and stored in current_cost and the depth is decremented by one as indicated in a block 522. Then the sequential operations return to decision block 504, checking for any unvisited commands at this level. When the chain is not empty, then the top element is popped from the chain and pushed onto the bottom of the queue, the cost of the chain is recalculated and stored in current_cost and the depth is decremented by one at block 522. Then the sequential operations return to decision block 504, checking for any unvisited commands at this level. When there is no time remaining at block 512, then the sequential operations end as indicated in a block 524.

Figure 6:
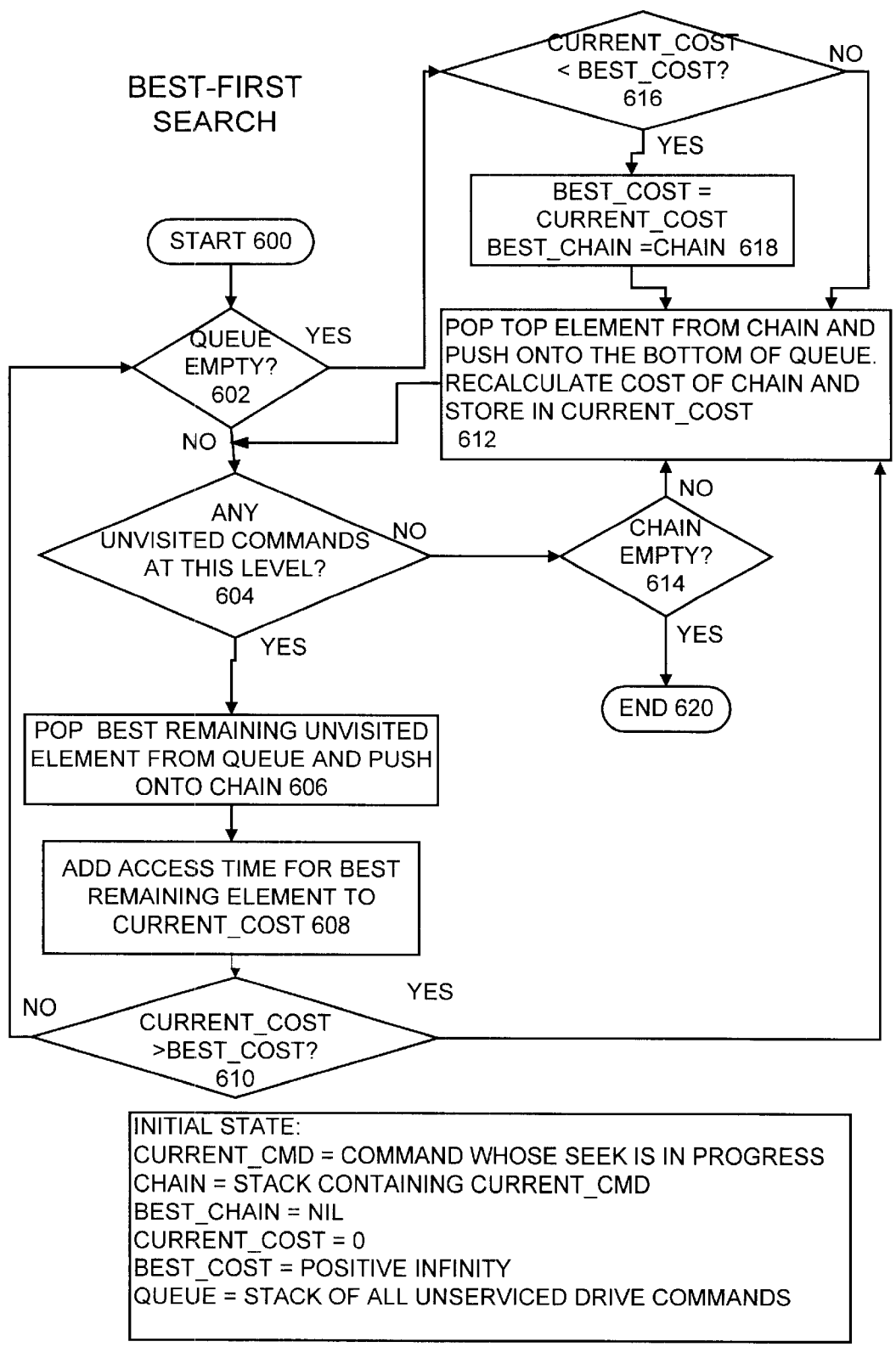

Referring to FIG. 6, there is shown a flow chart illustrating sequential steps for scheduling commands in accordance with a best-first search of the preferred embodiment starting at a block 600. The initial state includes a current_cmd or command whose seek is in progress, a chain or stack containing the current_cmd, a best_chain equal to nil, a current_cost equal to zero, a best_cost equal to positive infinity, and a queue or stack of all unserviced drive commands. Futility cut-offs are used to identify less than optimal branches. As commands are visited in the access graph, the total access time so far is kept. If this time exceeds the best time so far, searching this branch is stopped since it is not the optimal choice. In the best-first search, in order to make futility cut-offs occur more often, thereby reducing the size of the search space, the depth-first search should pick the minimum access time command to expand next at each level of the search or depth.

Checking for a depth equal to the limit is performed as indicated in a decision block 602. When the depth is not equal to the limit, checking for any unvisited commands at this level is performed as indicated in a decision block 604. When an unvisited command at this level is identified, then the top element is popped from the queue and pushed onto chain as indicated in a block 606. Then the access time for the best remaining element is added to current_cost as indicated in a block 608. Next checking whether the current_cost is greater than the best_cost is performed as indicated in a decision block 610. A futility cut-off function is provided at decision block 610. When the current_cost is not greater than the best_cost then the sequential operations return to decision block 602. When the current_cost is greater than the best_cost, then the top element is popped from the chain and pushed onto the bottom of the queue, the cost of the chain is recalculated and stored in current_cost as indicated in a block 612. Then the sequential operations return to decision block 604 checking for any unvisited commands at this level. When no unvisited commands at this level is identified at decision block 604, then checking for an empty chain is performed as indicated in a decision block 614. When the chain is not empty, then the top element is popped from the chain and pushed onto the bottom of the queue, the cost of the chain is recalculated and stored in current_cost 612. Then the sequential operations return to decision block 604 checking for any unvisited commands at this level. When depth is equal to the limit, then the current_cost is compared to the best_cost as indicated in a decision block 616. When the current_cost is less than the best_cost, then the best_cost is set to the current_cost and the best_chain is set to this chain as indicated in a block 618. Then the top element is popped from the chain and pushed onto the bottom of the queue, the cost of the chain is recalculated and stored in current_cost 612. Then the sequential operations return to decision block 604, checking for any unvisited commands at this level. When the chain is empty at decision block 614, then the sequential operations end as indicated in a block 620.

Figure 7:
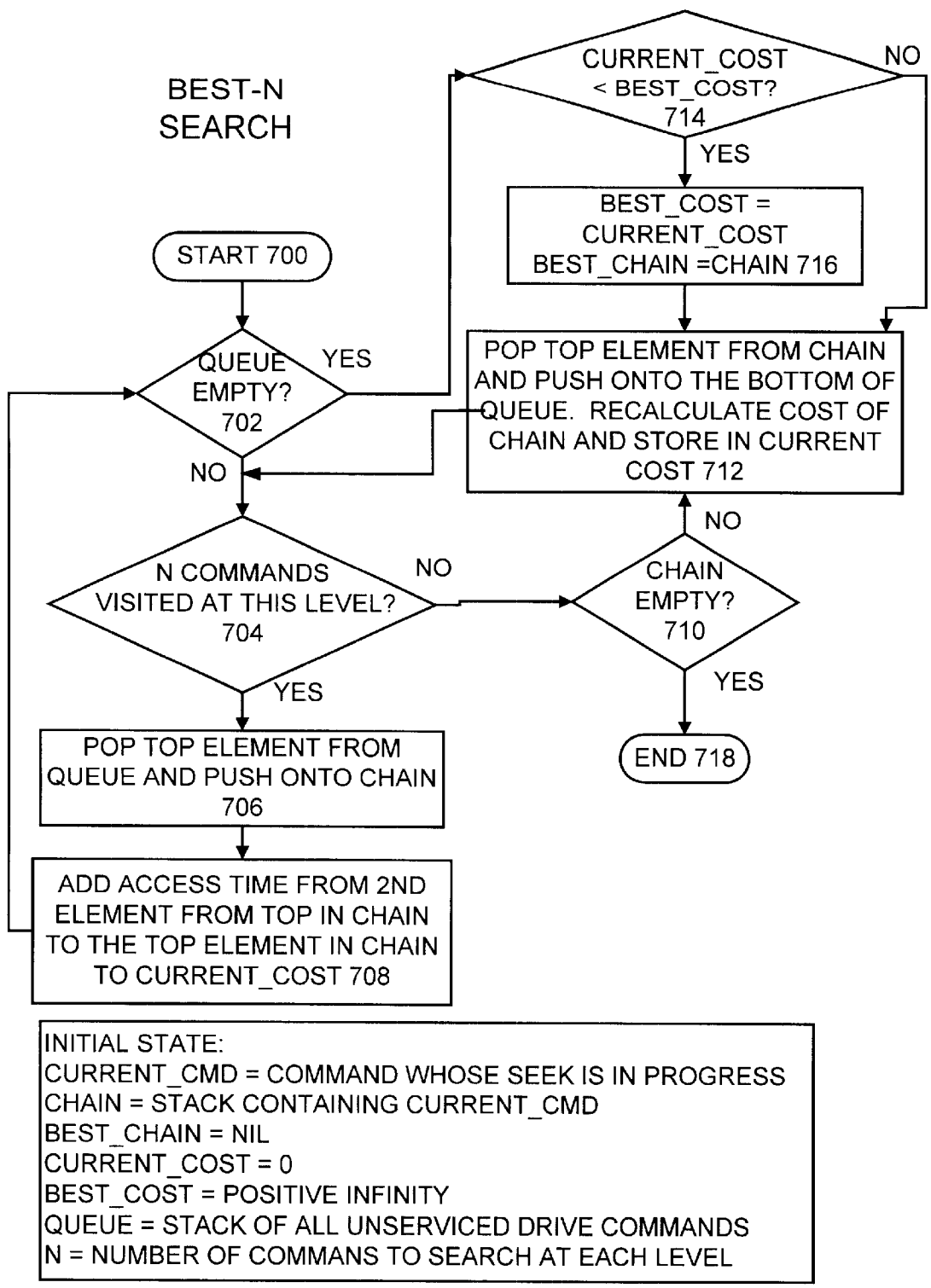

Referring to FIG. 7, there is shown a flow chart illustrating sequential steps for scheduling commands in accordance with a best-N search of the preferred embodiment starting at a block 700. The initial state includes a current_cmd or command whose seek is in progress, a chain or stack containing the current_cmd, a best_chain equal to nil, a current_cost equal to zero, a best_cost equal to positive infinity, a queue or stack of all unserviced drive commands and N, a number of commands to search at each level. Instead of expanding all of the choices at each level, only the best N commands are expanded. This reduces the number of states visited.

Checking for a depth equal to the limit is performed as indicated in a decision block 702. When the depth is not equal to the limit, checking for N commands visited at this level is performed as indicated in a decision block 704. When N commands have been visited at this level is identified, then the top element is popped from the queue and pushed onto chain as indicated in a block 706. Then the access time from second element from the top of the chain the top element in the chain is added to current_cost as indicated in a block 708. Then the sequential operations return to decision block 702. When N commands have not been visited at this level is identified at decision block 704, then checking for an empty chain is performed as indicated in a decision block 710. When the chain is not empty, then the top element is popped from the chain and pushed onto the bottom of the queue, the cost of the chain is recalculated and stored in current_cost and the depth is decremented by one as indicated in a block 712. Then the sequential operations return to decision block 704 checking for N commands visited at this level. When depth is equal to the limit, then the current_cost is compared to the best_cost as indicated in a decision block 714. When the current_cost is less than the best_cost, then the best_cost is set to the current_cost and the best_chain is set to this chain as indicated in a block 716. Then the top element is popped from the chain and pushed onto the bottom of the queue, the cost of the chain is recalculated and stored in current_cost and the depth is decremented by one at block 712. Then the sequential operations return to decision block 704, checking for N commands visited at this level. When the chain is empty at decision block 710, then the sequential operations end as indicated in a block 718.

Figure 8:
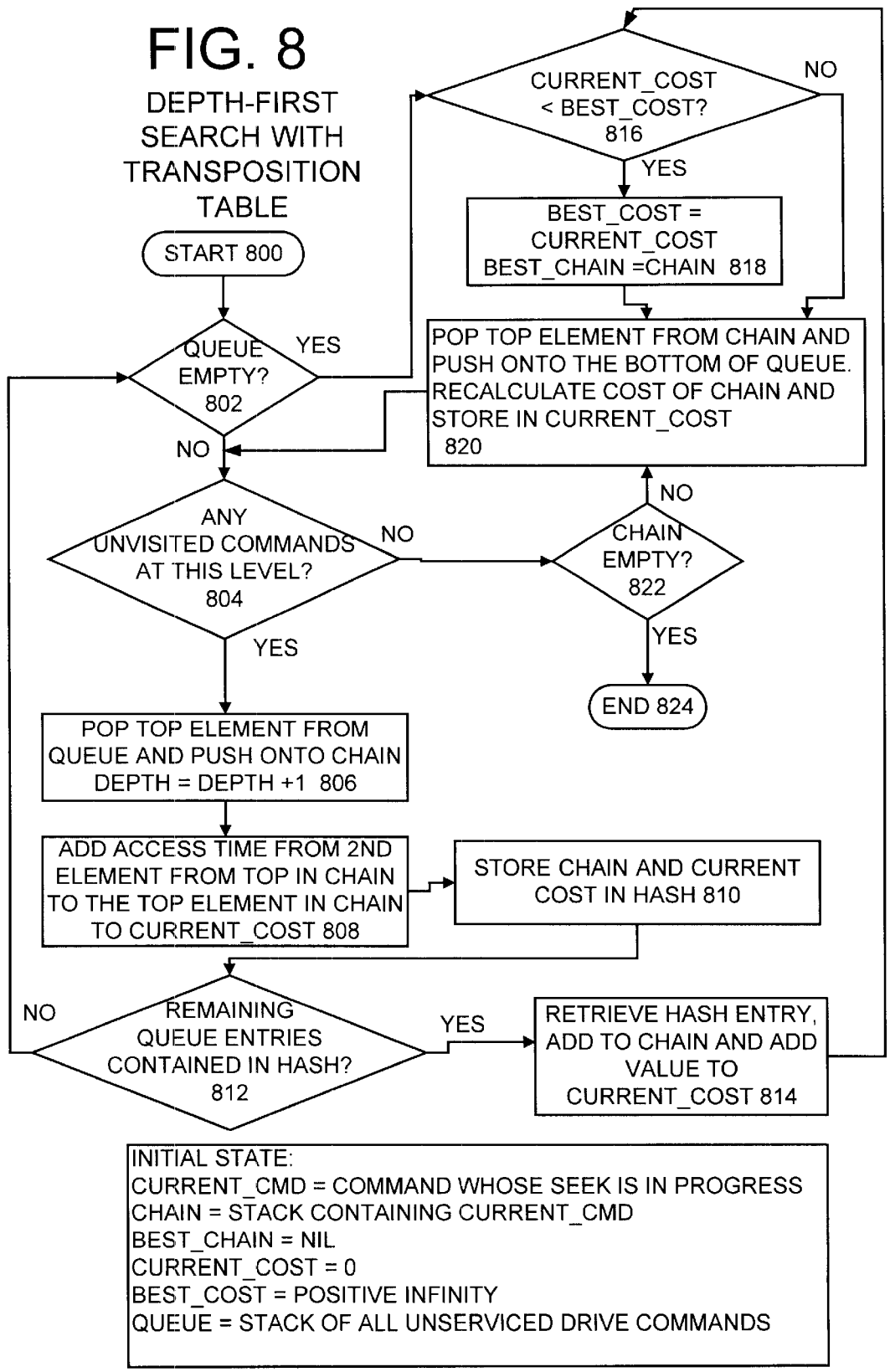

Referring to FIG. 8, there is shown a flow chart illustrating sequential steps for scheduling commands in accordance with a depth-first search with transposition table of the preferred embodiment starting at a block 800. The initial state includes a current_cmd or command whose seek is in progress, a chain or stack containing the current_cmd, a best_chain equal to nil, a current_cost equal to zero, a best_cost equal to positive infinity, a queue or stack of all unserviced drive commands and hash equal to an empty hash table which will contain chains. In searching the state space of commands, many partial sequences will repeat. By storing the results of the best partial path from that point, redundant calculation can be avoided. The preferred method of storage is a hash table. The transposition table information can be carried through to successive scheduling runs, as many of the commands are still in the queue. The transposition entries will be overwritten if a hash value to store collides with an entry that has invalid information.

Checking for an empty queue is performed as indicated in a decision block 802. When the queue is not empty, checking for any unvisited commands at this level is performed as indicated in a decision block 804. When an unvisited command at this level is identified, then the top element is popped from the queue and pushed onto chain as indicated in a block 806. Then the access time from second element from the top of the chain the top element in the chain is added to current_cost as indicated in a block 808. Next checking whether the remaining queue entries are contained in the hash table is performed as indicated in a decision block 810. When the remaining queue entries are not contained in the hash table, then the sequential operations return to decision block 802. When the remaining queue entries are contained in the hash table, then the hash entry is retrieved, added to the chain and value is added to the current cost as indicated in a block 814. Checking whether the current_cost is less than the best_cost is performed as indicated in a decision block 816. When the current_cost is less than the best_cost, then the best_cost is set to the current_cost and the best_chain is set to the current chain as indicated in a block 818. When the current_cost is greater than the best_cost, then the top element is popped from the chain and pushed onto the bottom of the queue, the cost of the chain is recalculated and stored in current_cost as indicated in a block 820. Then the sequential operations return to decision block 804 checking for any unvisited commands at this level. When no unvisited commands at this level is identified at decision block 804, then checking for an empty chain is performed as indicated in a decision block 822. When the chain is not empty, then the top element is popped from the chain and pushed onto the bottom of the queue, the cost of the chain is recalculated and stored in current_cost at block 820. Then the sequential operations return to decision block 804 checking for any unvisited commands at this level. When queue is empty, then the current_cost is compared to the best_cost at decision block 816. When the current_cost is less than the best_cost, then the best_cost is set to the current_cost and the best_chain is set to this chain at block 818. Then the top element is popped from the chain and pushed onto the bottom of the queue, the cost of the chain is recalculated and stored in current_cost at block 820. Then the sequential operations return to decision block 904, checking for any unvisited commands at this level. When the chain is empty at decision block 822, then the sequential operations end as indicated in a block 824.

Figure 9:
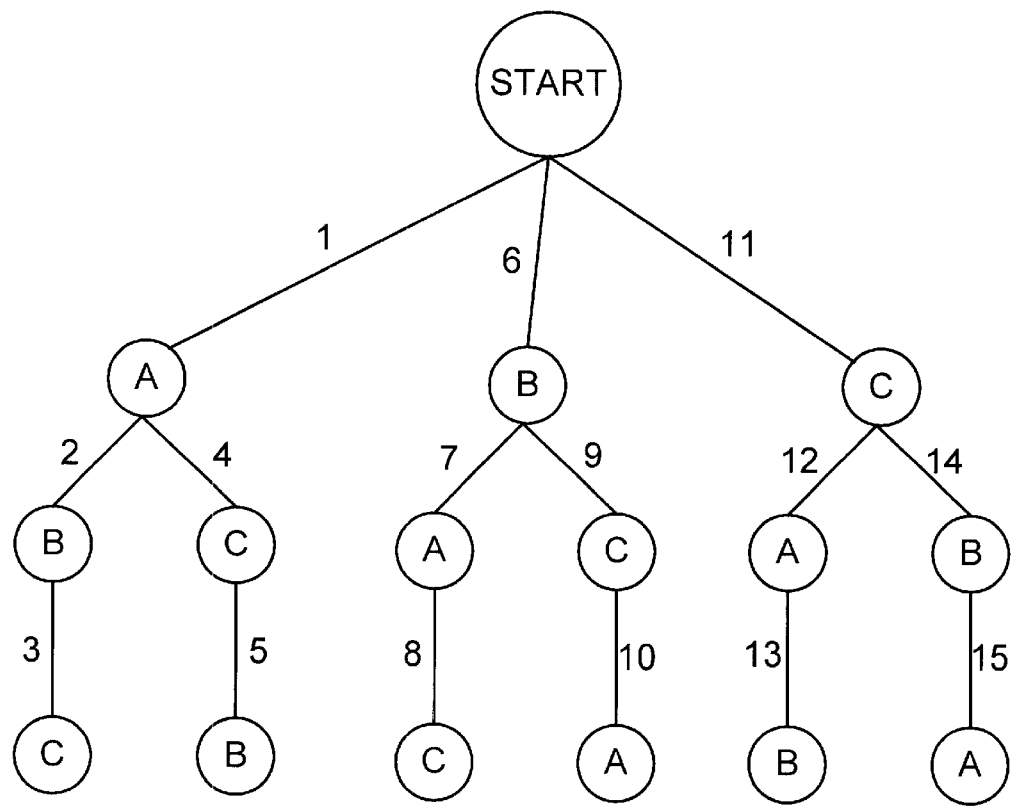
FIGS. 9–13 are illustrative trees showing possible ordering of commands in accordance with the preferred embodiment.
Figure 10:
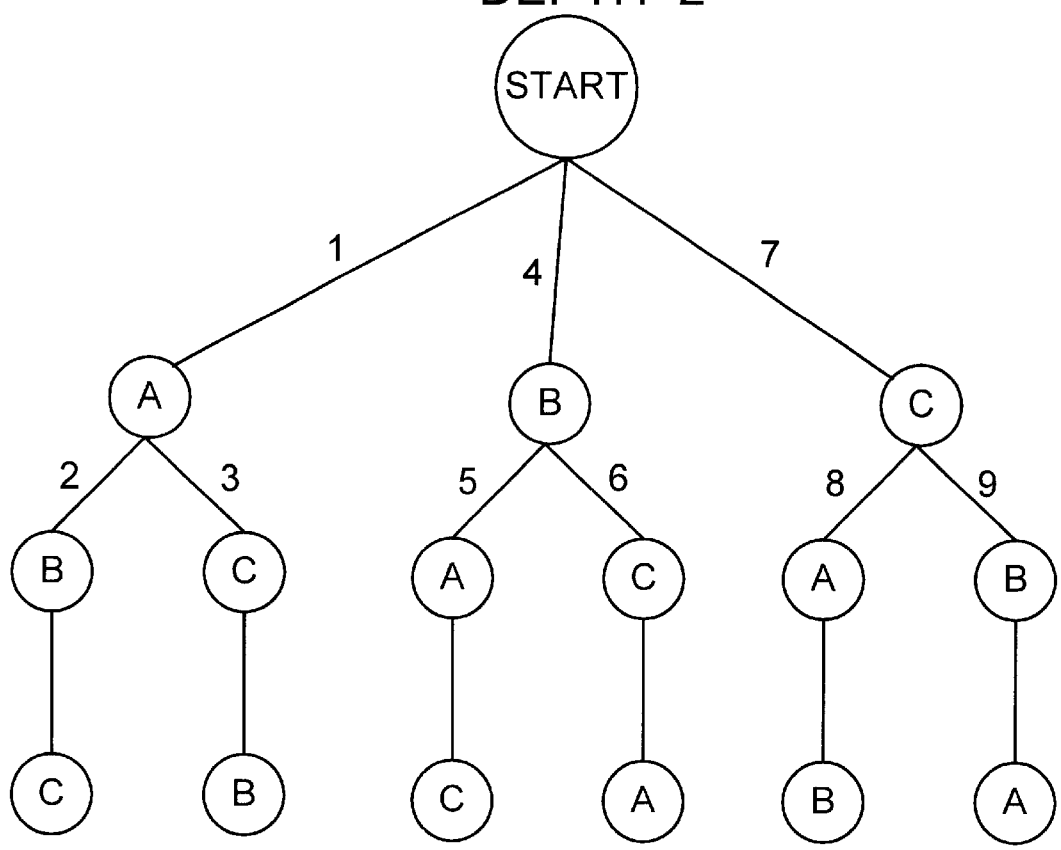
Figure 11:
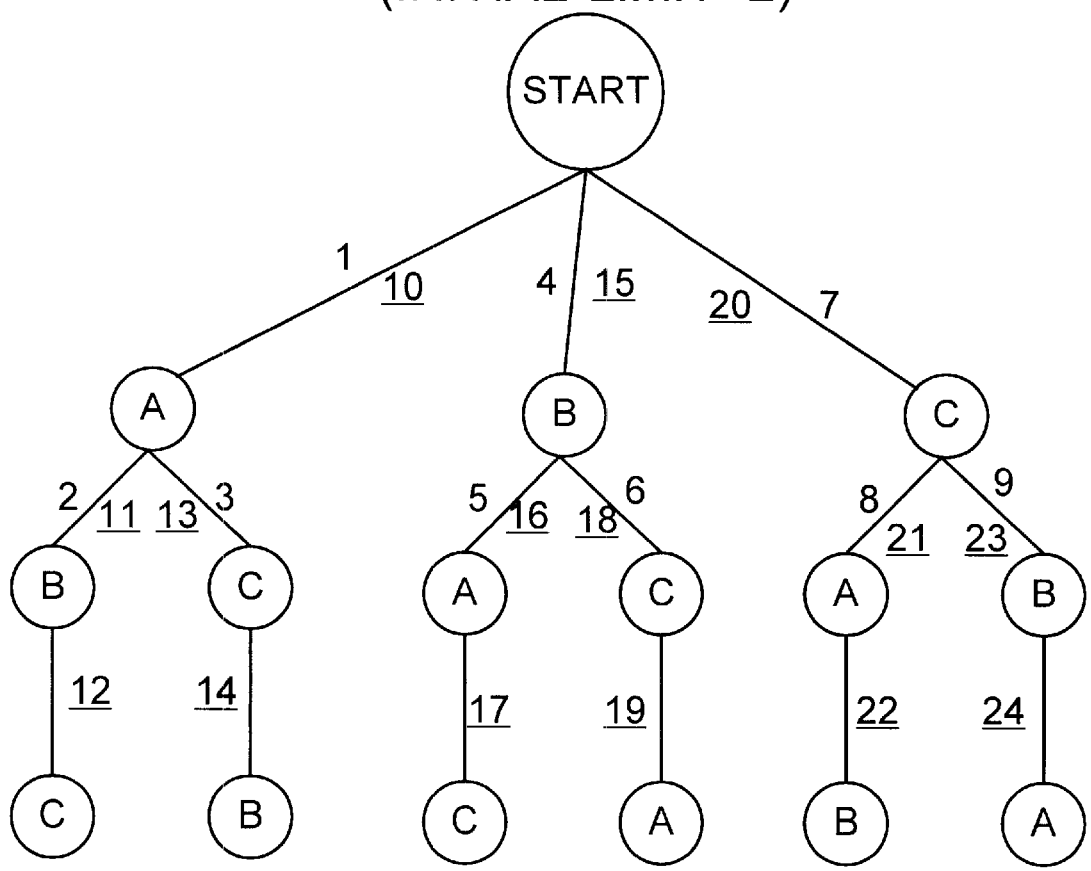
Figure 12:
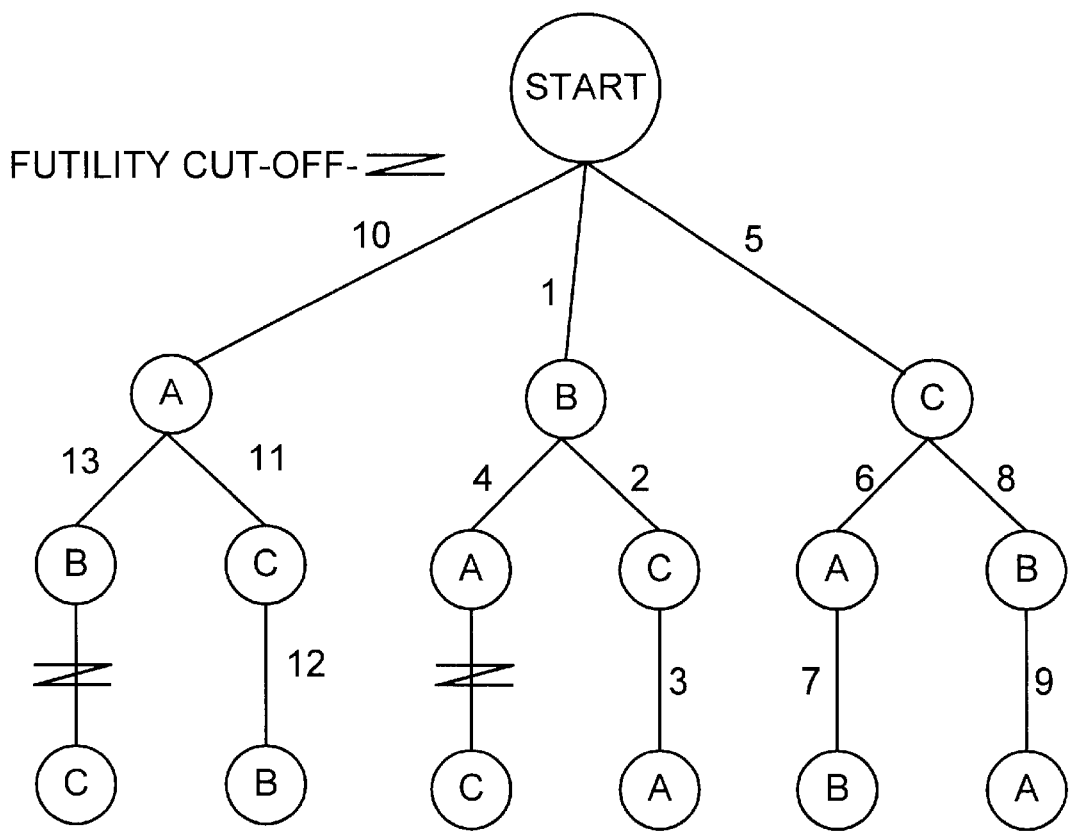
Figure 13:
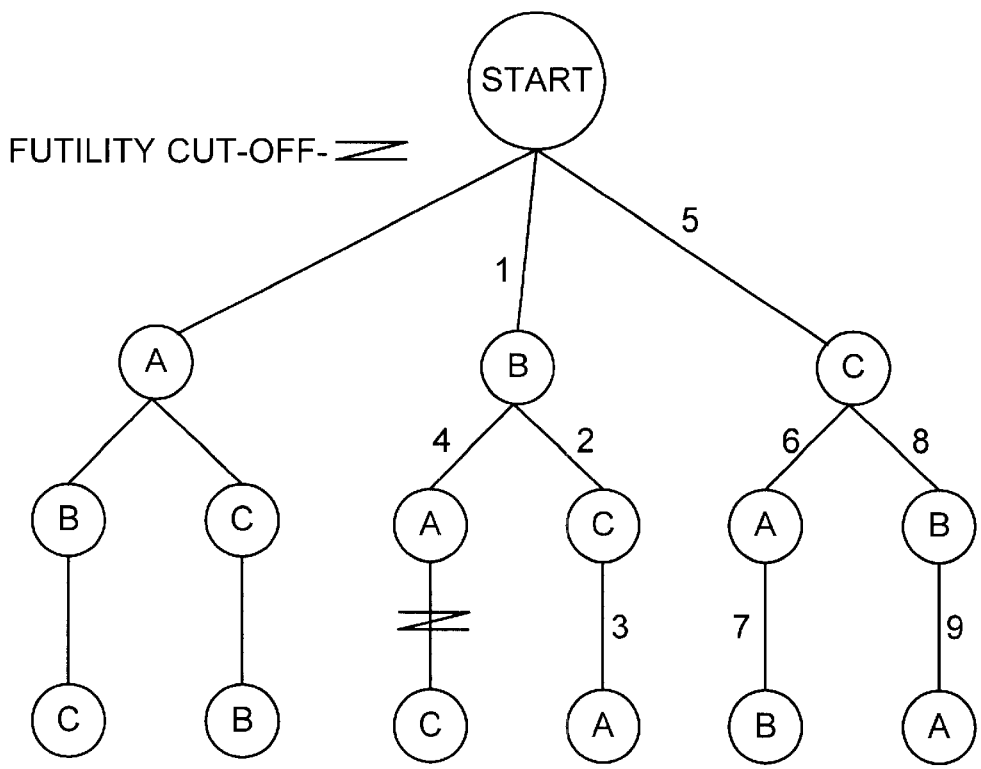

FIGS. 9–13 provide illustrative trees showing possible ordering of commands in accordance with the methods of the preferred embodiment. The tree represents every possible ordering of the commands. In each tree, A, B, and C are the commands in the queue. A complete list of all possible schedules can be obtained by traversing all possible paths or chains through the tree that start at a start node and lead to a terminal or lowermost node. The start node indicates the current executing command. Links between nodes are numbered in the order that they are visited. FIG. 9 illustrates a depth-first search, such as illustrated and described with respect to FIG. 3. FIG. 10 illustrates a depth-limited search where the depth equals two, such as illustrated and described with respect to FIG. 4. FIG. 11 illustrates an iterative deepening search with an initial limit of 2, such as illustrated and described with respect to FIG. 5. In FIG. 11, a first pass is shown with regular numbers and a second pass is shown with underlined numbers. FIG. 12 illustrates a best first search, such as illustrated and described with respect to FIG. 6. A best-N search, such as illustrated and described with respect to FIG. 7, is illustrated in FIG. 13.

Referring now to FIG. 14, an article of manufacture or a computer program product 1400 of the invention is illustrated. The computer program product 1400 includes a recording medium 1402, such as, a floppy disk, a high capacity read only memory in the form of an optically read compact disk or CD-ROM, a tape, a transmission type media such as a digital or analog communications link, or a similar computer program product. Recording medium 1402 stores program means 1404, 1406, 1408, 1410 on the medium 1402 for carrying out the methods for scheduling data accesses in a random access storage devices of the preferred embodiment in the system 100 of FIG. 1.

A sequence of program instructions or a logical assembly of one or more interrelated modules defined by the recorded program means 1404, 1406, 1408, 1410, direct the system 100 for scheduling data accesses in accordance with the preferred embodiment.

While the present invention has been described with reference to the details of the embodiments of the invention shown in the drawing, these details are not intended to limit the scope of the invention as claimed in the appended claims.

What is claimed is:

1. A method for scheduling commands for random access storage devices comprising the steps of:

identifying an initial stack of commands, said initial stack of commands including a current command with a seek in process, and a queue of all unserviced drive commands;

processing a plurality of possible chains for said initial stack of commands;

comparing said plurality of possible chains to identify one of said plurality of possible chains having a predetermined property; and selecting a first command of said identified one chain as a next command to execute.

2. A method for scheduling commands for random access storage devices as recited in claim 1 wherein the step of comparing said plurality of possible chains to identify one of said plurality of possible chains having a predetermined property includes the steps of comparing said plurality of possible chains to identify one of said plurality of possible chains having a shortest access time.

3. A method for scheduling commands for random access storage devices as recited in claim 1 wherein the step of comparing said plurality of possible chains to identify one of said plurality of possible chains having a predetermined property includes the steps of comparing said plurality of possible chains to identify one of said plurality of possible chains having a lowest energy usage.

4. A method for scheduling commands for random access storage devices as recited in claim 1 wherein the step of processing said plurality of possible chains for a queue of commands includes the steps of storing each possible chain for said queue of commands and calculating a total access time for each said possible chain for said queue of commands.

5. A method for scheduling commands for random access storage devices as recited in claim 1 wherein the step of processing said plurality of possible chains for a queue of commands includes the steps of sequentially of processing said plurality of possible chains and comparing a current cost for each of said sequentially processed plurality of possible chains with a best cost and storing only a current best chain.

6. A method for scheduling commands for random access storage devices as recited in claim 1 wherein the step of processing said plurality of possible chains for a queue of commands includes the steps of performing a depth limited search utilizing a set maximum depth.

7. A method for scheduling commands for random access storage devices as recited in claim 1 wherein the step of processing said plurality of possible chains for a queue of commands includes the steps of performing an iterative deepening search utilizing a set maximum depth and a set time period for searching.

8. A method for scheduling commands for random access storage devices as recited in claim 1 wherein the step of processing said plurality of possible chains for a queue of commands includes the steps of performing a best-first search utilizing a futility cut-off.

9. A method for scheduling commands for random access storage devices as recited in claim 8 includes the steps of maintaining a total access time while processing each of said plurality of possible chains and stopping searching a chain when said total access time exceeds a current best access time.

10. A method for scheduling commands for random access storage devices as recited in claim 1 wherein the step of processing said plurality of possible chains for a queue of commands includes the steps of performing a search utilizing a transposition table, said transposition table storing results of best partial sequences of said possible chains.

11. A method for scheduling commands for random access storage devices as recited in claim 1 wherein the step of processing said plurality of possible chains for a queue of commands includes the steps of performing a best-N search wherein N equals a set number of commands to search at each level.

12. Apparatus for scheduling commands for random access storage devices comprising:
a disk control processor;
a scheduling computer program product including a plurality of computer executable instructions stored on a computer readable medium, wherein said instructions, when executed by said disk control processor, cause the disk control processor to perform the steps of:
identifying an initial stack of commands, said initial stack of commands including a current command with a seek in process, and a queue of all unserviced drive commands;
processing a plurality of possible chains for said initial stack of commands;
comparing said plurality of possible chains to identify one of said plurality of possible chains having a predetermined property; and
selecting a first command of said identified one chain as a next command to execute.

13. Apparatus for scheduling commands for random access storage devices as recited in claim 12 wherein the step of comparing said plurality of possible chains to identify one of said plurality of possible chains having a predetermined property includes the steps of comparing said plurality of possible chains to identify one of said plurality of possible chains having a shortest access time.

14. Apparatus for scheduling commands for random access storage devices as recited in claim 12 wherein the step of comparing said plurality of possible chains to identify one of said plurality of possible chains having a predetermined property includes the steps of comparing said plurality of possible chains to identify one of said plurality of possible chains having a lowest energy usage.

15. Apparatus for scheduling commands for random access storage devices as recited in claim 12 wherein the step of processing said plurality of possible chains for a queue of commands includes the steps of performing a brute force search an d storing each possible chain for said queue of commands and calculating a total access time for each said possible chain for said queue of commands.

16. Apparatus for scheduling commands for random access storage devices as recited in claim 12 wherein the step of processing said plurality of possible chains for a queue of commands includes the steps of sequentially of processing said plurality of possible chains and comparing a current cost for each of said sequentially processed plurality of possible chains with a best cost and storing only a current best chain.

17. Apparatus for scheduling commands for random access storage devices as recited in claim 12 wherein the step of processing said plurality of possible chains for a queue of commands includes the steps of performing a depth limited search utilizing a set maximum depth.

18. Apparatus for scheduling commands for random access storage devices as recited in claim 12 wherein the step of processing said plurality of possible chains for a queue of commands includes the steps of performing a search utilizing a futility cut-off.

19. Apparatus for scheduling commands for random access storage devices as recited in claim 12 wherein the step of processing said plurality of possible chains for a queue of commands includes the steps of performing a search utilizing a transposition table for avoiding redundant calculations.

20. Apparatus for scheduling commands for random access storage devices as recited in claim 12 wherein the step of processing said plurality of possible chains for a queue of commands includes the steps of performing a best-N search wherein N equals a set number of commands to search at each level.

* * * * *